UNITED STATES PATENT OFFICE.

WILLIAM HEBDON, OF BOSTON, AND THOMAS F. MATHEWS, OF MALDEN, MASSACHUSETTS.

IMPROVEMENT IN COMPOUNDS FOR DRESSING TEXTILE FABRICS.

Specification forming part of Letters Patent No. 203,038, dated April 30, 1878; application filed July 31, 1877.

*To all whom it may concern:*

Be it known that we, WILLIAM HEBDON, of Boston, in the county of Suffolk, and THOMAS F. MATHEWS, of Malden, in the county of Middlesex, and State of Massachusetts, have invented certain Improvements in Sizing Compounds, of which the following is a specification:

This invention relates to that class of compounds used for dressing textile fabrics, wrapping-paper, or other materials or articles.

The invention consists in a composition formed by mixing alum, chloride of magnesium, starch, and glycerine with a sufficient quantity of water to form a liquid compound.

To prepare the compound, we mix the ingredients in about the following proportions, viz: One hundred pounds of chloride of magnesium; four hundred gallons of water; three pounds of alum; five pounds of glycerine; twenty pounds of starch. We dissolve the chloride of magnesium in the water; then dissolve the alum in the mixture thus formed; then add the glycerine, and, finally, add the starch, the latter being previously boiled, and in a semi-liquid state.

These proportions we have found to produce good results; but we do not limit ourselves strictly to them, as one or more may be varied to suit different requirements.

This compound we have found to give a firm, soft, and silky appearance to cloth or other articles or materials to which it is applied.

Among the effects of the separate ingredients are the following: The alum and chloride of magnesium tend to prevent mildew in the cloth to which the compound is applied. The starch fills the pores of the cloth and imparts body and stiffness thereto. The glycerine imparts a soft and silky feeling to the cloth. The chloride of magnesium holds the starch in solution and prevents it in a great measure from being precipitated—a feature of much value, as it enables the starch to readily fill the pores of the cloth.

The compound thus formed is invisible when dried in the cloth or other article to which it is applied, and cannot be beaten out. It is much cheaper than any compound for the same purpose heretofore produced, and at the same time has a better effect on the goods to which it is applied.

The compound may be substituted for starch as ordinarily used in the process of laundering garments which do not require to be made very stiff—such as white vests, dresses, handkerchiefs, &c.—its cheapness rendering it particularly available and practical for this purpose.

The starch may be omitted from the compound when it is not desirable to give the article to which the compound is applied the degree of stiffness which the starch imparts.

We claim as our invention—

A compound for dressing textile fabrics consisting of alum, chloride of magnesium, starch, and glycerine, mixed with water, substantially as described, for the purpose specified.

In testimony whereof we have signed our names to this specification in the presence of two subscribing witnesses.

WILLIAM HEBDON.
THOMAS F. MATHEWS.

Witnesses:
C. F. BROWN,
H. BROWN.